Nov. 5, 1968 P. B. H. ROBINSON ET AL 3,409,303

SOUND REPRODUCING APPARATUS

Filed Sept. 7, 1965 3 Sheets-Sheet 1

SOUND REPRODUCING APPARATUS

Filed Sept. 7, 1965 3 Sheets-Sheet 3

3,409,303
SOUND REPRODUCING APPARATUS

Paul Baron Henn Robinson, 26 Four Ashes Road, Bentley Heath, Knowle, Solihull, England, and Anthony Alfred James Homer, 116 Dorridge Road, Dorridge, Solihull, England Filed Sept. 7, 1965, Ser. No. 485,296
3 Claims. (Cl. 274—15)

ABSTRACT OF THE DISCLOSURE

Record playing apparatus operative in any position and including, a pickup constrained to move in a linear path along the radius of a record disc in assembly with apparatus which affect an electrical connection when said pickup reaches the run-out grooves of said record disc to cause the pickup to be lifted from record disc engagement and to be returned via the spring action of a lever to the start position, a drive wheel in contact with the underside of said record disc and two idler wheels in contact with the other side of said record disc for affecting stabilization of rotation of said record disc.

Figure 1:
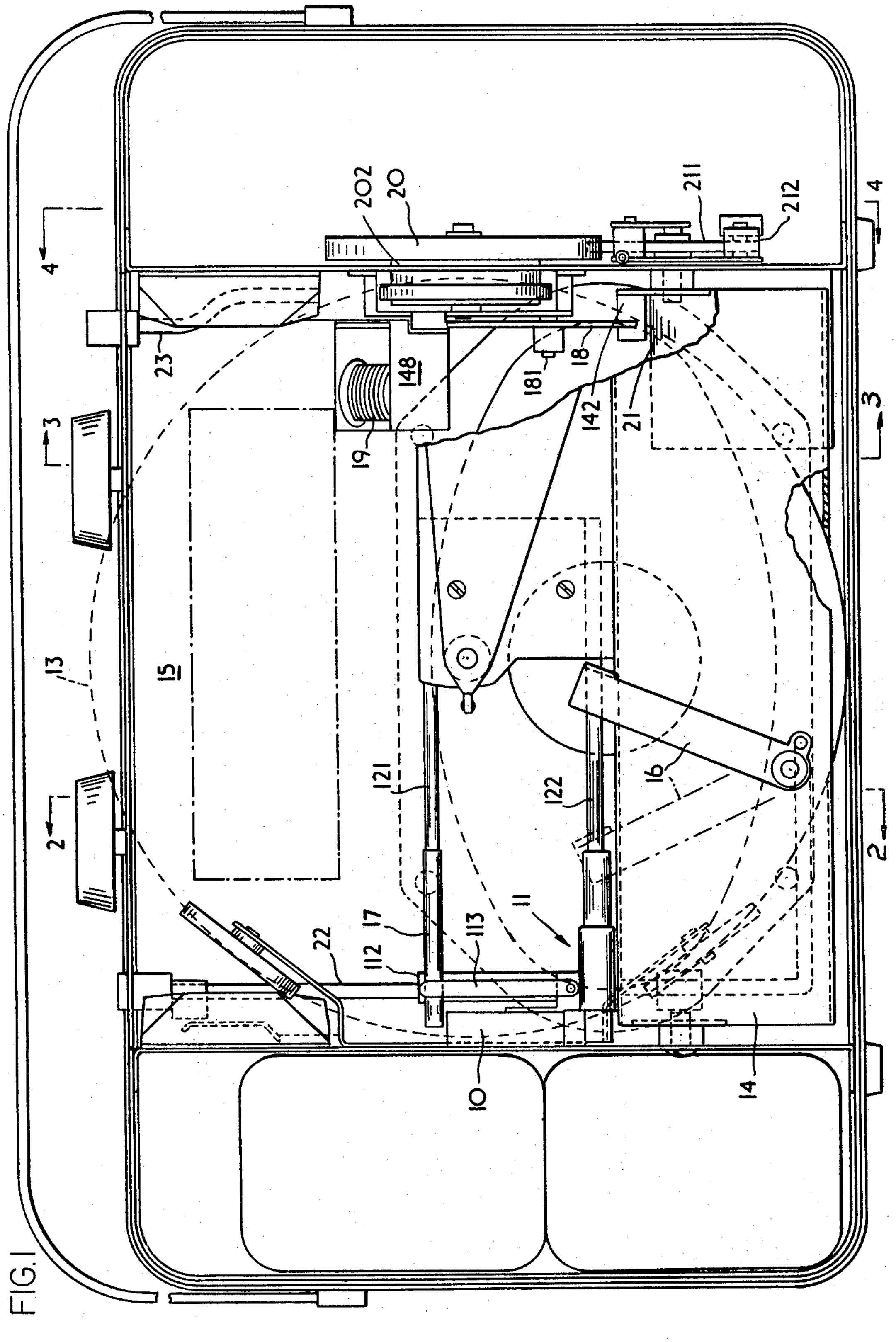

This invention has reference to sound reproducing apparatus and is concerned specifically with apparatus for the playing of record discs hereinafter termed "record players."

The present invention has for its object to provide a record player which can be carried readily in one hand or slung from the shoulder and which will admit of the playing of a record disc in any position in which the apparatus may be disposed.

Accordingly the invention consists of a record player in which the pick-up is constrained to move in a linear path along the radius of a record disc to be played and in which provision is made for moving the stylus associated with the pick-up into and out of contact with a record disc as may be required.

The invention also resides in the provision in conjunction with the pick-up of means for arresting the rotation of the record disc and for restoring the pick-up automatically to the start position subsequent to completion of the playing of a record disc.

The invention further resides in a record player having a pick-up which is constrained to move in a linear path along the radius of a record disc being played which is constructively arranged and adapted for use substantially as will be described hereinafter.

An embodiment of the invention will now be described with particular reference to the accompanying drawings which illustrate the invention as applied to a record player which is constructively arranged and adapted to operate in general substantially as disclosed in an application filed concurrently with this present application.

Figures 2, 6:
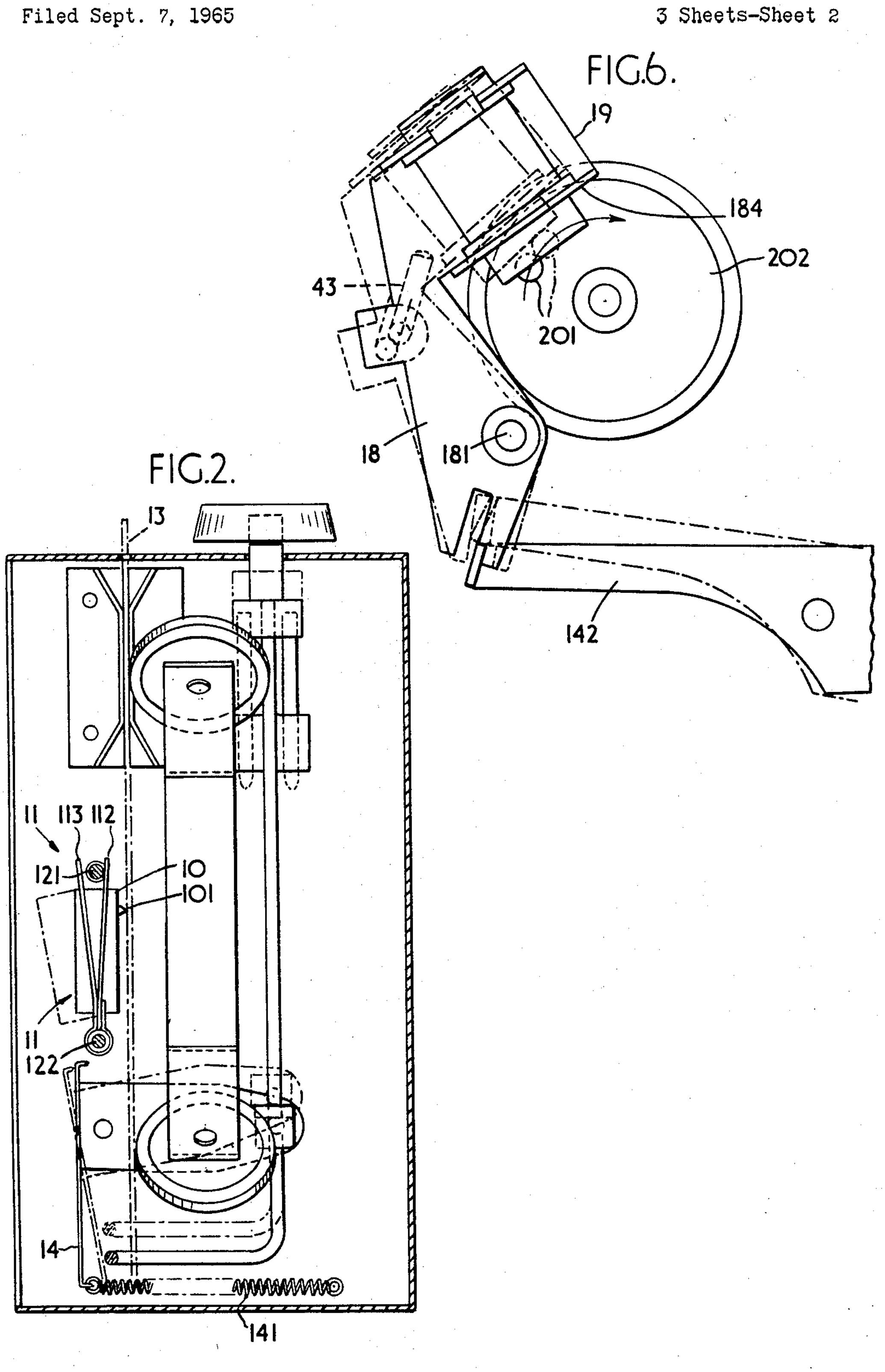
Figure 3:
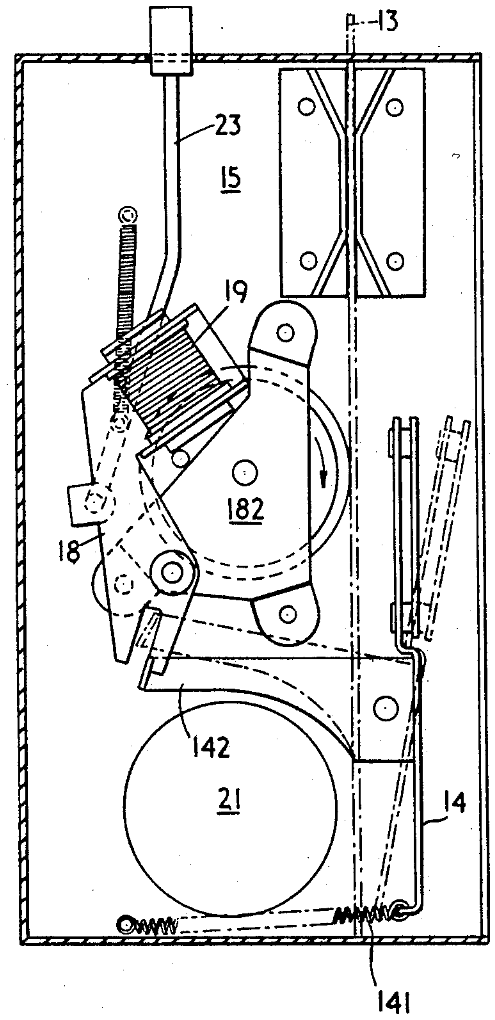
Figure 4:
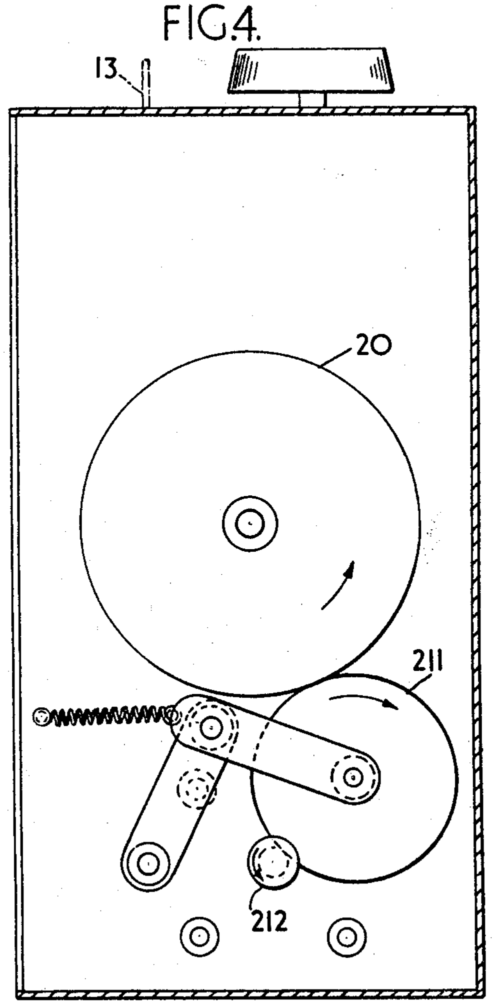
Figure 5:
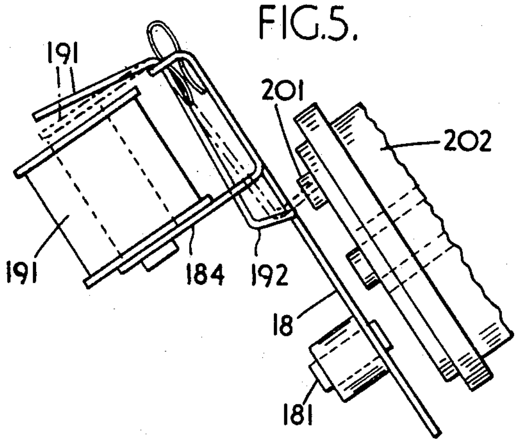

In the drawings:

FIGURE 1 is a rear view of the record player as set for playing with the back of the casing removed and with parts omitted where desirable for the sake of clearness, FIGURE 2 is a section taken on the plane indicated by the line 2—2 in FIGURE 1 looking in the direction of the arrows to the said line, FIGURE 3 is a section taken on the plane indicated by the line 3—3 in FIGURE 1 looking in the direction of the arrows to the said line, FIGURE 4 is a section taken on the plane indicated by the line 4—4 in FIGURE 1 looking in the direction of the arrows to the said line, and FIGURES 5 and 6 are fragmentary views on an enlarged scale illustrative of the manner of operation of the latch mechanism embodied in the record player as illustrated in FIGURES 1–4.

In the drawings sufficient only of the mechanism is shown as is necessary to an understanding of the invention having regard to the disclosures contained in our aforesaid concurrently filed patent application.

In the drawings like numerals of reference are used to designate similar parts in the several views.

According to the said illustrated embodiment of the invention a pick-up cartridge 10 of conventional construction is associated with a carriage which is designated generically by the reference numeral 11 and which is mounted on and adapted to be traversed in a linear path on a pair of parallel rods 121, 122 of metal of good electrical conductivity arranged equidistantly on either side of the location of the centre of a record disc 13 when occupying the playing position.

A pair of rods 121, 122 aforesaid are mounted on a carrier plate 14 which is hinged to the chassis 15 of the apparatus and which is capable of being tilted so as to bring the stylus 101 of the pick-up cartridge 10 into contact with the record disc 13 when in the playing position and to remove the stylus 101 from such a position automatically after the completion of a playing or as required for other reasons such as for example the discontinuance of a playing preparatory to the substitution of another record disc 13.

The carriage 11 aforesaid incorporates a sleeve 111 of a synthetic plastics material having a low co-efficient of friction which is adapted to slide on the rod 122 aforesaid and to co-operate with an arm 16 hereinafter termed the reject arm 16 as and for a purpose to be described hereinafter.

Mounted on the outer end portion of the other rod 121 is a sleeve 17 of a synthetic plastics material of poor electrical conductivity and low co-efficient of friction.

The carriage 11 has associated therewith a pair of upstanding oppositely disposed strips 112, 113 the innermost of which namely that designated 112 is resilient and tends to remain in bearing contact with the sleeve 17 or the rod 121 on which the sleeve 17 is mounted whilst the other strip namely that designated 113 comes into action to remove the stylus 101 of the pick-up cartridge 10 from the playing position when so required. The reject arm 16 is associated with spring means 141 (see FIGURE 3) which is stressed during tilting of the carrier plate 14 to the playing position so that after tilting of the carrier plate 14 into the playing position the spring means 141 tends to return the reject arm 16 to the start position, see dotted line position FIGURE 1 as well as to move the carrier plate 14 and the parts carried thereby to the out of action position.

The hinged carrier plate 14 is provided with a latch 142 which co-operates with a catch lever 18 for latching the hinged carrier plate 14 when tilted into the playing position see FIGURES 3 and 6, said catch lever 18 being pivotally mounted at 181 on a bracket 182 fixed to the chassis 15.

The rod 121 is included in the electrical circuit through a solenoid 19 which is mounted on a bracket 184 formed integral with the pivotal catch lever 18. The armature 191 associated with the solenoid 19 is provided with a tail 192 which can be projected in the path of a peg 201 on the boss 202 associated with a flywheel 20 adapted to be driven through a friction wheel 211 adapted in turn to be driven by friction from the rotor shaft 212 of an electric motor 21 which provides the motive source for rotating the record disc 13 as described in our concurrently filed patent application. The tail or projection 192 aforesaid is adapted to be struck by the said peg 201 for tripping the latch 142 as and when required and for a purpose to be set forth hereinafter.

The tail 192 is normally biased out of the path of the peg 201 by a light hair-pin spring 193.

The operation of the invention is as follows:

The stylus 101 of the pick-up carriage 10 is moved into contact with the record disc 13 when installed in the playing position as described in our aforesaid concurrently filed patent application by the direct manipulation of a starting control 22 and when the stylus has been moved into contact with the record disc 13 by the actuation of the said starting control 22 the hinged carrier plate 14 becomes latched with the stylus 101 in the playing position see particularly full line position FIGURE 6.

The manipulation of the starting control 22 also occasions movement of the free end of the reject arm 16 towards the centre of the record disc 13 to be played and causes the said reject arm 16 to be moved over-centre so that the free end of the reject arm 16 is retained adjacent to the centre of the record disc 13 during playing see full line position, FIGURE 1.

Whilst playing proceeds the synthetic plastic sleeve 111 traverses the guide rod 122 upon which is mounted in the direction of the centre of rotation of the record disc 13.

When the stylus 101 runs into the run-off groove of the record disc 13 being played at the end of a playing the strip 112 rides off the sleeve 17 and into contact with the rod 121 and thereby occasions an energisation of the solenoid 19 so that the projection 192 of the armature 191 is moved into an obstructing position relatively to the stop peg 201 on the boss 202 of the flywheel 20. Whereupon on continued rotation of the electric driving motor 21 the stop peg 201 is caused to strike the armature projection 192 and cause this projection 192 to trip the catch lever 18 from engagement with the latch lever 142 holding the hinged carrier plate 14 in the playing position see dotted line position, FIGURES 3 and 6.

The tripping of the latch lever 142 allows the hinged carrier plate 14 to be moved to draw the stylus 101 of the pick-up cartridge 10 out of the playing position under the influence of the energy stored in the spring means 141 which is stressed when the said hinged carrier plate 14 is tilted into the playing position.

Concurrently the reject arm 16 is freed and under the influence of the spring means 141 caused to move to the dotted line position in FIGURE 1 and thereby to occasion the return of the carriage 11 to the start position as seen in FIGURE 1.

It will be appreciated that the guided action afforded to the pick-up cartridge 10 constrains the stylus 101 to move in a linear path which is always the locus of the radius of the record disc 13 being played.

It will be appreciated also that as the carrier plate 14 is latched when in the playing position and the stylus of the pick-up cartridge 10 is held in the playing position by the lightly loaded resilient strip 112 these factors in conjunction with the low mass weight of the carriage 11 ensure that a record disc 13 may be played irrespective of the disposition of the apparatus as a whole.

Furthermore it will be appreciated that automatic stoppage is occasioned on the completion of the playing of a record disc 13.

If desired playing may be interrupted at any time during playing by depressing the rod 23 the lower end of which is pivoted to the catch lever 18 and thereby unlatching the latch lever 142 and causing the removal of the stylus 101 from contact with the record disc which was being played and the restoration of the carriage to the start position through the agency of the reject arm 16 as aforesaid.

Although the invention has been described as applied to a record player as described in our concurrently filed patent application it is to be understood that the invention may be applied to record players generally.

We claim:

1. In a record player comprising a pick-up constrained to move in a linear path along the radius of a record, said pick-up having a stylus associated therewith and mounted on a carriage which is slidably mounted on a rod arranged parallel to a diameter which passes through the centre of the record disc being played during playing so that the pick-up and hence the stylus carried thereby is constrained to move in a linear path along the radius of a record disc to be played and in which the rod aforesaid is carried by a hinged plate adapted under the manipulation of a control means to move the stylus into contact with a record disc preparatory to playing and in which provision is made for latching the hinged carrier plate in the playing position during playing and in which means is provided for automatically moving the hinged carrier plate out of the playing position when a playing has been completed and in which means is provided for restoring the pick-up automatically to the start position subsequent to the unlatching of the hinged carrier plate on the completion of the playing of a record disc and a second rod is provided which is arranged parallel to the rod on which the carriage is transversely mounted and in which the said second rod is made of metal of good electrical conductivity and is included in an electrical circuit including electro-mechanical means for effecting the automatic unlatching of the hinged carrier plate subsequent to the completion of the playing of a record disc.

2. A record player as claimed in claim 1 in which the rod opposite to that on which the carriage is mounted is provided on the outer portion with a sleeve of a synthetic plastics material of poor electrical conductivity and low co-efficient of friction so that an electrical contact making member in slidable contact therewith is electrically insulated until the stylus rides into and completes its run in the run-off groove of a record disc upon the completion of a playing whereupon the electro-mechanical means aforesaid is caused to be brought into action.

3. A record player as claimed in claim 1 in which the rod which is included in the circuit of the automatic unlatching means controls the energization of a solenoid the armature whereof is adapted to be moved into an obstructing position relatively to means carried by a power-driven part of the record player so that when the electric circuit including the said rod is completed and the solenoid energized the armature is moved into an obstructing position and on further rotation of the motive means caused to effect an unlatching of the hinged carrier plate and thus to occasion the movement of the stylus out of the playing position and the automatic return of the carriage to the start position.

References Cited

UNITED STATES PATENTS

| | | | |
|---|---|---|---|
| 2,941,810 | 6/1960 | Wagner | 274—13 |
| 2,244,506 | 6/1941 | Staszkiewiecz | 274—13 |
| 2,219,230 | 10/1940 | Krause | 274—2 |

LEONARD FORMAN, *Primary Examiner.*

FELIX J. D'AMBROSIO, *Assistant Examiner.*